[22.]
CHARLES W. HERMANCE.
Improvement in Elastic Wheel for Traction Engines.
No. 118,934. Patented Sep. 12, 1871.
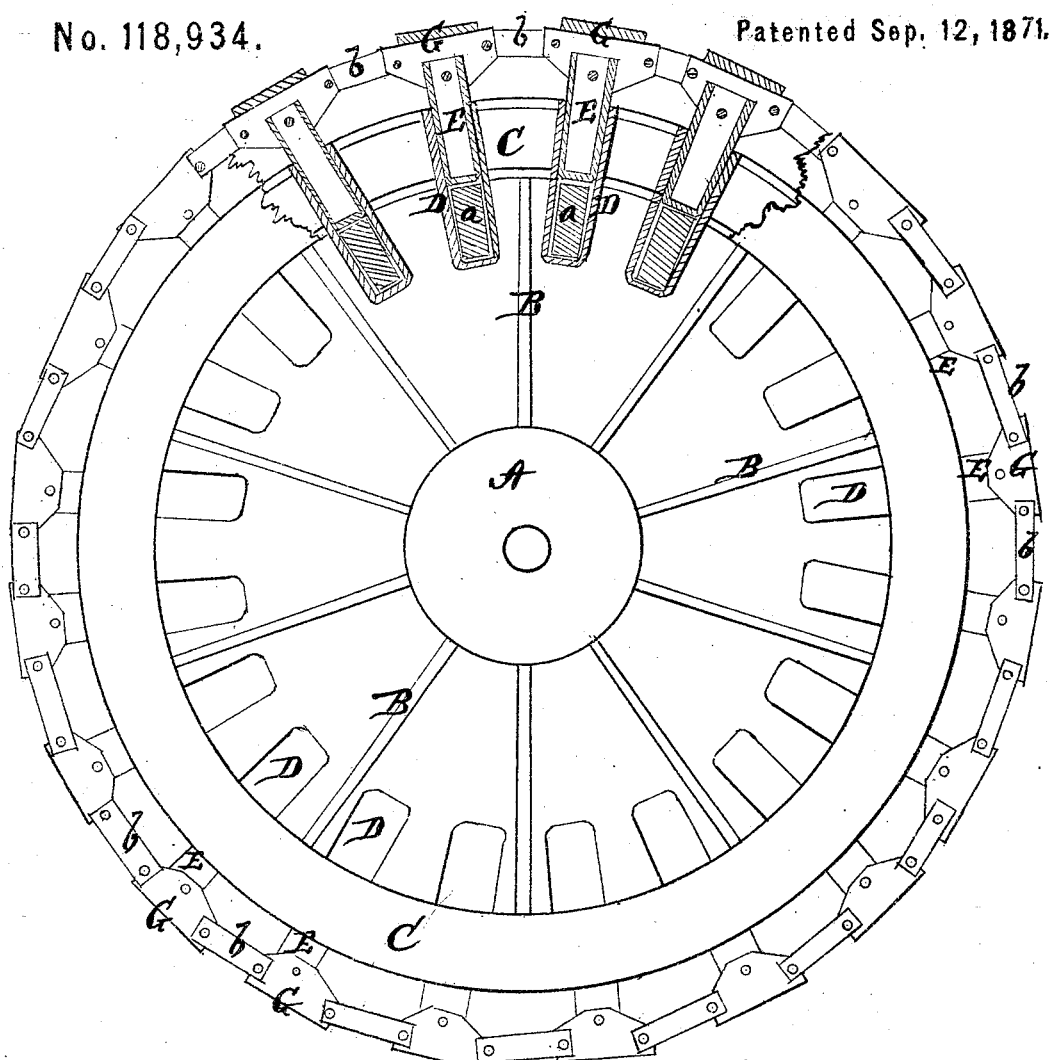
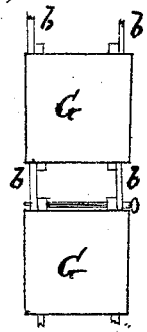
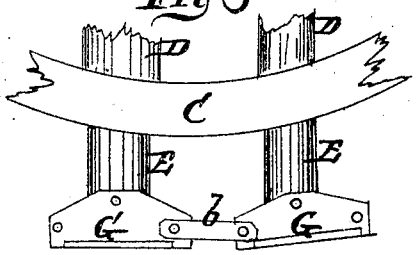

UNITED STATES PATENT OFFICE.

CHARLES W. HERMANCE, OF SCHUYLERSVILLE, NEW YORK.

IMPROVEMENT IN ELASTIC WHEELS FOR TRACTION-ENGINES.

Specification forming part of Letters Patent No. 118,934, dated September 12, 1871.

*To all whom it may concern:*

Be it known that I, CHARLES W. HERMANCE, of Schuylersville, in the county of Saratoga and in the State of New York, have invented certain new and useful Improvements in Elastic Wheels for Traction-Engines; and do hereby declare that the following is a full, clear, and exact description thereof, reference being had to the accompanying drawing and to the letters of reference marked thereon making a part of this specification.

The nature of my invention consists in the application of rubber springs to the wheels of vehicles propelled by steam, in such a manner as to render their tread elastic, thereby relieving the engine and machinery from strain and concussions when propelled over rough roads.

In order to enable others skilled in the art to which my invention appertains to make and use the same, I will now proceed to describe its construction and operation, referring to the annexed drawing, in which—

Figure 1 is a side view of my wheel, part in section; and Figs. 2 and 3 are detached portions of the same.

A represents the hub; B B the spokes, and C the rim of a traction engine-wheel of any suitable construction. Trough the rim C passes a series of sockets, D D, radially inward for a suitable distance, and at equal distances apart. In the bottom of each of these sockets is placed a rubber spring, $a$, and upon the same rests a short plunger, E, which projects a suitable distance beyond the outer surface of the rim C. To the outer end of each plunger E is pivoted a shoe, G, which entirely incloses said end, and the shoes G G are connected by links $b\ b$, the whole forming a complete elastic tread for the wheel.

The distinguishing feature of my invention over others for like purpose is its simplicity, strength, and durability, as well as cheapness, compared with other devices. I am aware that rubber has heretofore been used to give elasticity to traction-wheels in the form of an endless belt or rubber tire encircling the outside of the rim or fellies of the wheel; but such tires are objectionable in consequence of their great cost and lack of durability, for, by constantly coming in contact with the uneven surfaces and other obstructions over which they must pass, they are soon destroyed. Therefore, I do not claim endless belts of rubber forming a tire outside of the rim of the wheels; but—

What I do claim as new, and desire to secure by Letters Patent, is—

The combination, with the hub A and spokes B B, of the rim C with its series of sockets D with springs $a$, plungers E, pivoted shoes G, and connecting-links $b$, forming the periphery of the wheel, all constructed and arranged substantially as set forth.

In testimony that I claim the foregoing I have hereunto set my hand and seal this 16th day of June, 1871.

CHAS. W. HERMANCE. [L. S.]

Witnesses:
G. F. WATSON,
J. H. DE RUIDER.        (22.)